(No Model.) 2 Sheets—Sheet 1.

G. L. SHOREY.
HEAT REGULATING APPARATUS.

No. 446,212. Patented Feb. 10, 1891.

Witnesses
Albert E. Leach
M. H. Thompson

Inventor
Geo. L. Shorey
by Wm. B. H. Dowse
Atty

UNITED STATES PATENT OFFICE.

GEORGE L. SHOREY, OF LYNN, MASSACHUSETTS.

HEAT-REGULATING APPARATUS.

SPECIFICATION forming part of Letters Patent No. 446,212, dated February 10, 1891.

Application filed April 28, 1890. Serial No. 349,796. (No model.)

*To all whom it may concern:*

Be it known that I, GEORGE L. SHOREY, a citizen of the United States, residing at Lynn, in the county of Middlesex and Commonwealth of Massachusetts, have invented certain new and useful Improvements in Heat-Regulating Apparatus, of which the following is a full specification.

My invention consists of an improved hydraulic heat-regulating apparatus, wherein the draft-regulating damper or dampers of a stove or furnace are automatically controlled by water-power directed by changes in temperature in the apartments to be heated. To this end the said damper is indirectly operated alternately by a constant weight adapted, when acting unimpeded upon the damper, to move it to an extreme position, (either open or closed,) and by a variable weight of water or other liquid preponderating over the constant weight to move the said damper to the opposite extreme position, the said weight of water or other liquid being shifted, imposed, or removed by changes in temperature in one of the apartments to be heated through the medium of electric circuits, alternately opening and closing a valve controlling the flow of water to produce the variable weight, in the manner hereinafter described.

Figure 1:
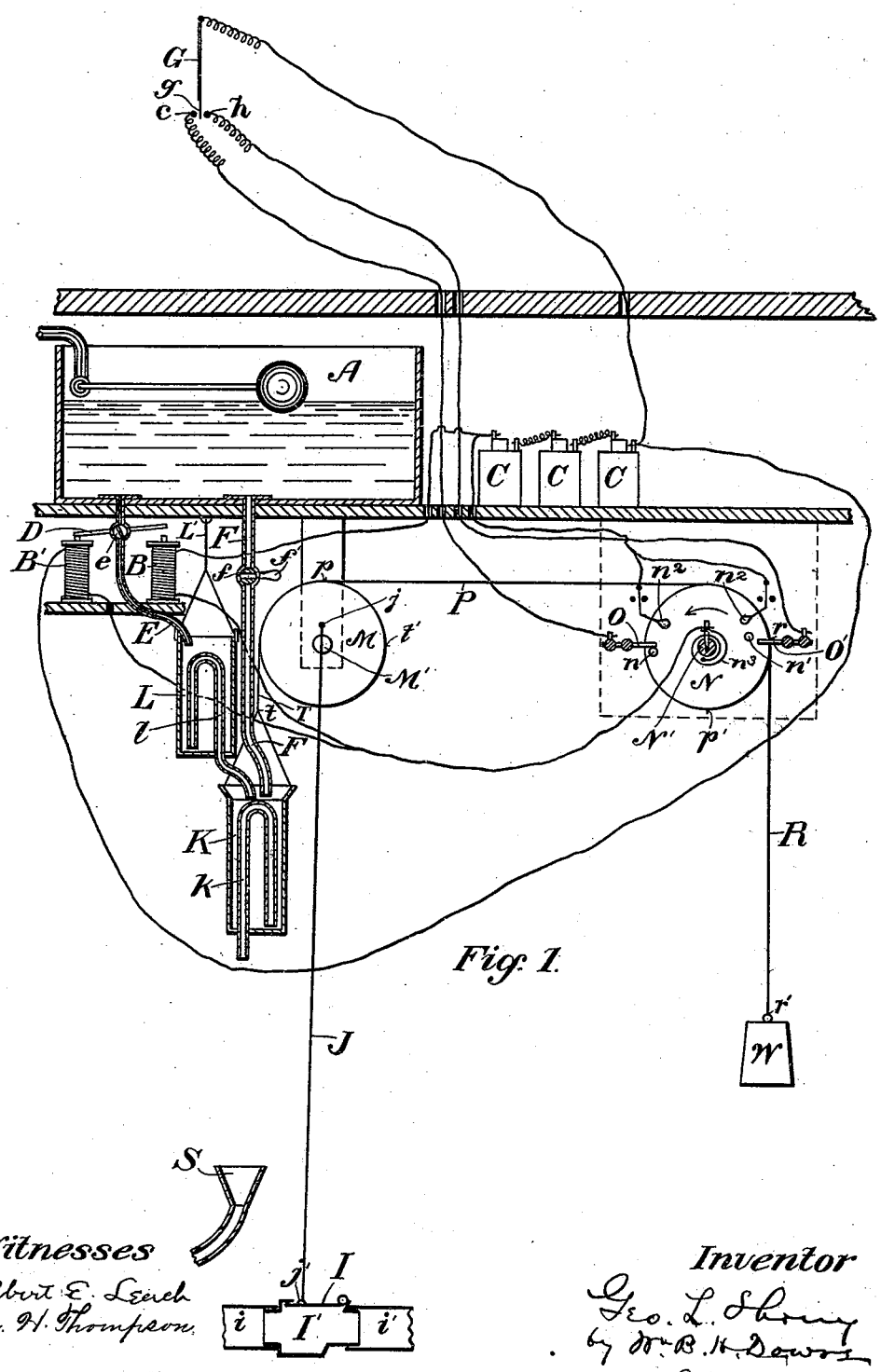
Figure 2:
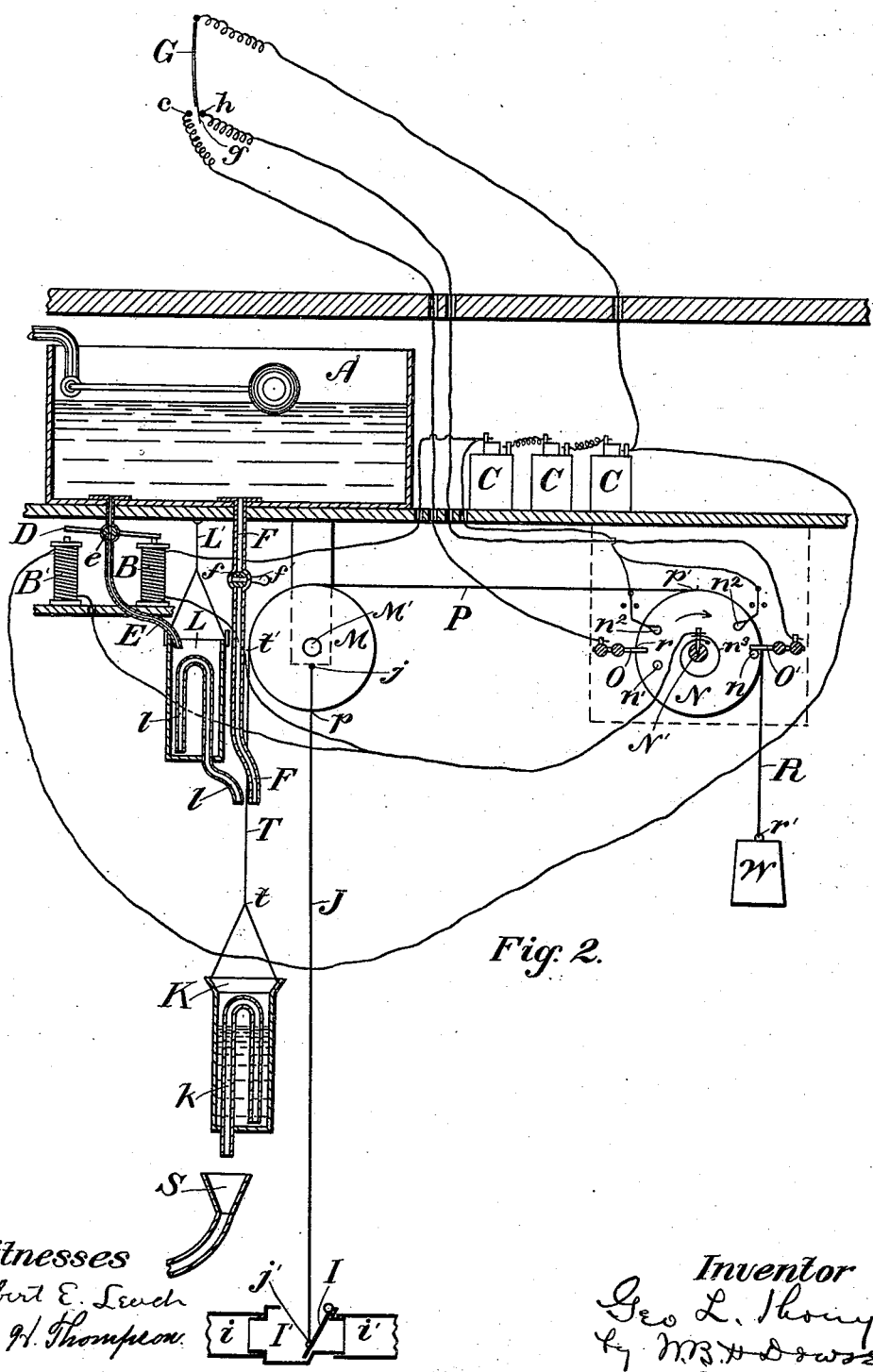

Of the accompanying drawings, Figure 1 is a sectional view of my apparatus, showing the parts in position corresponding to the closed position of the regulating-damper. Fig. 2 is a similar view, but with parts in position for holding the damper open.

I have shown my improved apparatus as operating upon a single draft-regulating damper of the kind shown and described in an application for United States Letters Patent for improvements in furnaces filed by me, the serial number of which application is 349,153. A damper of this construction and arrangement completely controls the furnace-draft. It consists, as here shown, of a flap-damper I, inclosed in a case I' having an inlet-opening on top to the outside air which, when uncovered by the damper, as in Fig. 2, supplies air through the pipe $i$ to the ash-pit for the fire. When, however, the air-inlet opening is closed by the damper, as shown in Fig. 1, the fire is checked by reason of a direct path from the ash-pit to the chimney through the pipes $i\ i'$, in the manner described in said furnace application. This apparatus is, however, equally well adapted for use with any form of check-damper, as will be readily seen, or it may operate two or more dampers, if desired.

G is a thermostat of any approved construction—such that one end of a metallic piece is caused by changes in temperature to move into contact with one or the other of two metallic knobs, pins, or screws $h\ c$. I preferably employ a thermostat in which, by the unequal expansion of strips of metal and gutta-percha connected together, the above result is accomplished. This thermostat G is situated in one of the apartments to be heated, and the contact-points $h$ and $c$ are arranged at such a distance apart that for a given change of temperature the lower end $g$ of the thermostat will contact with one or the other of the two points $h\ c$—for instance, the arrangement might be such that when the temperature in the room reached 70° the end $g$ would contact with $h$, and when the temperature fell to $69\frac{1}{2}°$ it would contact with $c$.

M and N are two pulleys mounted, preferably, to turn on fixed spindles M' N', and connected by a rope or chain P, the ends of which are secured at $p\ p'$ to the rims of the pulleys M and N, respectively.

W is a weight attached at $r'$ to one end of a rope or chain, the other end of which is secured at $r$ to the rim of the pulley N.

K is a cup or vessel suspended by means of the cord or chain T, to which it is attached at $t$, the other end of the chain being secured at $t'$ to the rim of the pulley M.

The water which supplies the motive power for operating the damper is contained in a tank A, preferably provided with a ball and cock for keeping the water at a constant level therein and affording a constant supply.

L is a stationary cup or vessel suspended at the proper height in any suitable manner, as by the cord or chain L', in such a position that the fine tube E from the bottom of the tank can supply water to the cup. The tube E is provided with the valve $e$, which turns on or shuts off the flow of water through the tube, being operated in a manner presently to be described. The vessel L is provided with a siphon $l$, arranged to empty the vessel when nearly filled into the vessel K, suspended from the pulley M. The vessel K is also provided with a siphon $k$, arranged to empty the contents of the said vessel K when nearly filled into the waste-pipe S.

The damper I is connected with the pulley M by the cord or chain J, one end $j$ being attached to the face of the pulley, the other $j'$ to the damper I.

B and B' are two electro-magnets alternately acting upon an armature D, which is fixed to the stem of the valve $e$ in such a manner than when the magnet B acts upon the armature the valve $e$ is open, and when the magnet B' acts thereon the valve $e$ is closed. One end of each magnet-wire is connected with the battery C, while the other end of each magnet-wire is electrically connected to the knob or pin $n$ on the pulley N through the spindle N' and connecting spring-wire $n^3$, the pulley N being preferably of metal.

O and O' are stationary metal strips wired to connect respectively with the contact-points $h$ and $c$, and held in such a position that when the pulley N makes a half-revolution one way or the other the knob or pin $n$ engages either with the strip O or the strip O' at the end of the half-revolution. The pulley N is also provided on its face with the knob or pin $n'$, so placed as not to engage with the strips O O', but to make electrical contact at each half-revolution with knobs $n^2$, borne, preferably, on the ends of springs, both knobs $n^2$ being connected electrically with the battery C. The metallic arm of the thermostat G is also connected to the battery.

The operation of the apparatus is as follows: Assuming that the apartments heated are of a temperature somewhere between the limits of $69\frac{1}{2}°$ and 70°, the end $g$ of the thermostat will be in contact with neither of the points $h$ and $c$, as in Fig. 1, the valve $e$ will be cut off so that no water will flow out of the tank A, both vessels L and K being empty, the vessel K being at its uppermost and the weight W at its lowest position, and the damper I being closed so as to check the fire. In this position of parts all electrical circuits are broken and inactive. This condition of things continues until by the continued checking of the fire the temperature of the apartments is reduced to the lowest limit, which we have assumed to be $69\frac{1}{2}°$. The end $g$ of the thermostat will then be in contact with the point $c$, the result being that a circuit will be closed through the metallic strip O', knob $n$, and pulley N, magnetizing the electro-magnet B and opening the valve $e$. Water will then flow in a fine stream into the stationary vessel L until it is nearly full, when it will overflow into the vessel K through siphon $l$, the size of which is greater than the tube E, so that the vessel L is soon emptied. The vessel K with its contents will then weigh much more than the weight W, so that the said vessel will descend, raising the weight W and opening the damper I. As the vessel K descends both wheels M and N will make a half-revolution, and the instant the knob $n$ leaves the strip O the circuit through the magnet B will be broken. The knob $n'$ will, however, contact with both the knobs $n^2$ as the pulley N makes its half-revolution, thus closing the circuit through the magnet B' and cutting off the flow of water. Two knobs $n^2$ are provided instead of one for safety, so that if one should fail to close the circuit by poor contact or any other cause the other would surely do so. The damper I remains open till the fire caused by the increasing draft gets so hot as to heat the apartment containing the thermostat to the highest limit, which has been assumed as 70°. When this limit has been reached the end $g$ of the thermostat will contact with $h$, completing the second circuit through the magnet B and turning on the valve $e$, the parts being at this stage in the position shown in Fig. 2. The result will be that the stationary vessel L will again fill and be emptied when full through the siphon $l$ into the vessel K, filling the same above its siphon $k$, which being larger than the siphon $l$ quickly empties the said vessel K, and the variable weight being thus removed the weight W will exert its force, falling by gravity and causing the vessel K to rise again, thus shutting the damper I and checking the fire. The pulley N in making the half-revolution in the direction of the arrow shown thereon in Fig. 2 will cause the knob $n'$ to contact with the knobs $n^2$, thus closing the circuit through the cut-off magnet B' and shutting the supply-valve $e$. This action is kept up indefinitely, the damper being thus opened and closed by two weights alternately preponderating one over the other, according as the water weight in the vessel K is imposed or removed.

I might dispense with the intermediate stationary siphon vessel L and have the supply-pipe E give water directly to the movable or balancing vessel K; but I prefer for safety to interpose said stationary vessel in order that a given amount of water may at each operation be supplied to the movable balancing-vessel sufficient to insure its positive movement to its lowest point, thus surely closing the electric cut-off circuit through the magnet B' in its passage.

F is a second pipe leading from the tank A, by which water may be supplied directly to the movable vessel K. This pipe F is provided with a valve $f$, operated by a handle $f'$, and by this means the damper-actuating mechanism may be operated by hand irrespective of the thermostat to open or close the damper when desired.

Any number of dampers may be operated by the same mechanism by chains connecting said dampers to either or both the pulleys M and N in the same manner as the damper I.

The waste-pipe S, I preferably run to the evaporating-pan of the furnace, thus utilizing the waste water.

I do not confine myself to the use of two pulleys over which the alternately preponderating weights are balanced. One pulley only might obviously be used, or instead of the pulleys the weight W and the balancing-vessel K might be suspended from the ends of a pivoted lever, which by its movement one way or the other opens and closes the damper or dampers and breaks and opens the electrical circuits.

I claim—

1. In a heat-regulating apparatus, the combination, with a source of fluid-pressure provided with a valve, of two electric circuits alternately opening said valve, a thermostat alternately closing said circuits, and an independent circuit operated by suitable hydraulic mechanism to close said valve between the openings thereof, all constructed, arranged, and operating substantially as and for the purposes described.

2. In a heat-regulating apparatus, the combination, with a circuit-closing thermostat, of a supply-pipe provided with a valve operated through said circuit by the movement of said thermostat, a movable balancing-vessel K, provided with a siphon and emptied thereby when the water from said pipe overflows said siphon, and a balanced damper operated by the removal of said water, substantially as described.

3. In a heat-regulating apparatus, the combination, with a movable balancing-vessel K, of a damper opened and closed by the movement of said vessel, a supply-vessel L, provided with a siphon, whereby the amount of water to be supplied for the movement of the balancing-vessel is adjusted, and a suitably-controlled source of fluid pressure for supplying said vessel L, substantially as described.

4. In a heat-regulating apparatus, the combination, with a thermostat, of an electro-magnet and two circuits, both connected therewith, a supply-pipe and valve in position to be operated by either of said circuits through said magnet, and a damper-operating water-holder alternately filled and emptied and alternately breaking said circuits, substantially as and for the purposes described.

5. In a heat-regulating apparatus, the combination, with a thermostat, of an electro-magnet and two circuits, both connected therewith, a supply-pipe and a valve in position to be opened by either of said circuits through said magnet, a damper-operating water-holder alternately filled and emptied and alternately breaking said circuits, a third electric circuit, and a valve-closing magnet, all arranged and operating substantially as and for the purposes described.

6. In a heat-regulating apparatus, a variable damper-operating weight consisting of a movable balanced liquid-receiving vessel provided with a siphon, in combination with a source of fluid-pressure, substantially as described.

In witness whereof I have hereunto set my hand.

GEO. L. SHOREY.

Witnesses:
WM. B. H. DOWSE,
ALBERT E. LEACH.